Oct. 6, 1936.  J. A. M. SMELT  2,056,627
GLASS COMPOSITION TRANSPARENT TO ULTRAVIOLET LIGHT
Filed April 14, 1931
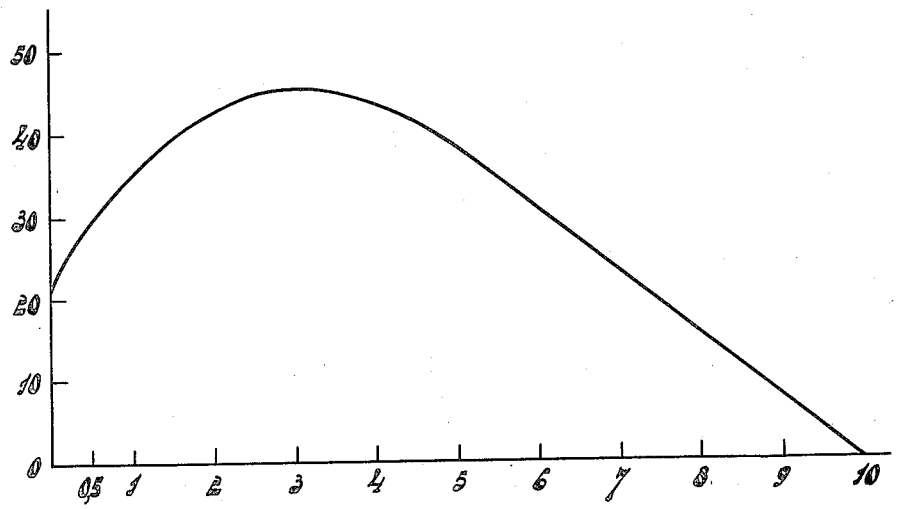
Inventor:
J.A.M. Smelt,
by
Atty.

Patented Oct. 6, 1936                                                                 2,056,627

UNITED STATES PATENT OFFICE 2,056,627

GLASS COMPOSITION TRANSPARENT TO ULTRAVIOLET LIGHT

Josephus Antonius Maria Smelt, Eindhoven, Netherlands, assignor, by mesne assignments, to General Electric Company, a corporation of New York Application April 14, 1931, Serial No. 530,092
In the Netherlands May 20, 1930

3 Claims. (Cl. 106—36.2)

This invention has reference to an ultra-violet lamp.

It is well known that boron-silicate glass free from alkali oxide having added to it calcium fluoride as a flux is transparent to ultra-violet light. These glass mixtures being, however, not well adapted to be worked up, they are not used in practice to any appreciable extent.

It has been found that even if a fusion contains alkali oxide the addition of fluoride increases under certain conditions the transparency of the resulting glass to ultra-violet light.

Thus the ordinary species of glass in use in the manufacture of glass bulbs can be used after addition of fluoride as an envelope for ultra-violet sources.

Based on the above recognition the invention has for its object an ultra-violet lamp in which the glass of the bulb contains fluoride and is practically devoid of lead, antimony or titane.

In addition it has been found that the quantity of fluoride to be added in order to ensure a given transparency to ultra-violet light depends on the choice of the other elementary bodies. This quantity should not be large enough to bring about a trouble of the glass and thus to decrease the transparency to ultra-violet light. As fluorides adapted for use according to the invention may be mentioned for example $Na_2SiF_6$, $NH_4FHF$ and $KF$.

The two last-mentioned fluorides are generally the most pure and for this reason they are preferably used.

Examples of species of glass adapted for use according to the invention are assembled in the following schedule:

| Elementary bodies | I | II | III | IV |
|---|---|---|---|---|
|  | Percent | Percent | Percent | Percent |
| $SiO_2$ | 65 | 67 | 78.4 | 70.7 |
| $B_2O_3$ | 2 | 2.1 | 15.7 | |
| $Na_2O$ | 5.5 | 5.7 | 5.1 | 16.7 |
| $K_2O$ | 9.5 | 9.8 | 0.8 | 1 |
| $BaO$ | 15 | 15.4 |  | 2.6 |
| $CaO$ |  |  |  | 9 |
| $ZnO$ | 3 |  |  |  |
| Proportion of Fe calculated as $Fe_2O_3$ | 0.03 | 0.03 | 0.03 | 0.12 |

The glass mixture I has added to it 1 kilogram of $NH_4FHF$ and the glass mixtures II, III, and IV had added to them 3 kilograms of $NH_4FHF$ for 100 kilograms of glass.

The influence of these additions on the transparency to ultra-violet light is indicated by way of example in the following schedule for a wave length of 2804 Å and a glass-thickness of 1 mm.

Transparency to wave length.—2804 A
(glass-thickness 1 mm.)

|  | Without addition | With addition $NH_4FHF$ |
|---|---|---|
|  | Percent | Percent |
| I | 28 | 40 |
| II | 17 | 49 |
| III | 14 | 45 |
| IV | 0.6 | 5.5 |

If a good transparency to wave lengths in the neighbourhood of 2800 Å=desired, species of glass are preferably used in which the content of iron is not higher than 0.1%.

The curve in the accompanying graph shows the variation of the transparency to a wave length=2804 Å of the aforementioned species of glass II at varying quantities of added fluoride. On the ordinate are plotted the percentages of ultra-violet light transmitted and on the abscissa the number of kilograms of $NH_4FHF$ added for 100 kilograms of glass. The thickness of the glass used is 1 mm.

What I claim is:

1. A glass for radiating ultra-violet light consisting of substantially 65% $SiO_2$, substantially 2% $B_2O_3$, substantially 5.5% $Na_2O$, substantially 9.5% $K_2O$, substantially 15% $BaO$, substantially 3% $ZnO$, iron in traces and a quantity of fluoride in the ratio of 1 kilogram of fluoride to 100 kilograms of the glass mixture.

2. A glass for radiating ultra-violet light consisting of substantially 67% $SiO_2$ substantially 2.1% $B_2O_3$, substantially 5.7% $Na_2O$, substantially 9.8% $K_2O$, substantially 15.4% $BaO$, iron in traces and a quantity of fluoride in the ratio of 3 kilograms of fluoride to 100 kilograms of the glass mixture.

3. A glass for radiating ultra-violet light consisting of substantially 78.4% $SiO_2$, substantially 15.7% $B_2O_3$, substantially 5.1% $Na_2O$, substantially 0.8% $K_2O$, iron in traces and a quantity of fluoride in the ratio of 3 kilograms of fluoride to 100 kilograms of the glass mixture.

JOSEPHUS ANTONIUS MARIA SMELT.